United States Patent
Asplund et al.

(10) Patent No.: US 9,106,289 B2
(45) Date of Patent: Aug. 11, 2015

(54) ANTENNA DEVICE AND METHOD FOR PRECODING DATA IN A MULTIPLE-INPUT MULTIPLE-OUTPUT SYSTEM

(75) Inventors: Henrik Asplund, Stockholm (SE); Bo Hagerman, Tyresö (SE); George Jöngren, Sundyberg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/879,991

(22) PCT Filed: Oct. 19, 2010

(86) PCT No.: PCT/SE2010/051129
§ 371 (c)(1),
(2), (4) Date: Apr. 17, 2013

(87) PCT Pub. No.: WO2012/053948
PCT Pub. Date: Apr. 26, 2012

(65) Prior Publication Data
US 2013/0202058 A1    Aug. 8, 2013

(51) Int. Cl.
| | |
|---|---|
| H04B 7/04 | (2006.01) |
| H04B 7/02 | (2006.01) |
| H04L 25/03 | (2006.01) |
| H04B 7/06 | (2006.01) |
| H04L 5/00 | (2006.01) |

(52) U.S. Cl.
CPC ............ *H04B 7/0456* (2013.01); *H04B 7/024* (2013.01); *H04B 7/0469* (2013.01); *H04B 7/0473* (2013.01); *H04L 25/03343* (2013.01); *H04B 7/0697* (2013.01); *H04L 5/0023* (2013.01); *H04L 2025/03426* (2013.01)

(58) Field of Classification Search
CPC ...................................................... H04B 7/0639
See application file for complete search history.

(56) References Cited

U.S. PATENT DOCUMENTS

| | | |
|---|---|---|
| 2007/0165736 A1 | 7/2007 | Wang et al. |
| 2007/0223423 A1 | 9/2007 | Kim et al. |
| 2011/0075752 A1* | 3/2011 | Zheng et al. ................. 375/267 |
| 2011/0116563 A1* | 5/2011 | Vitthaladevuni et al. ..... 375/260 |
| 2012/0213310 A1* | 8/2012 | Ko et al. ....................... 375/295 |

FOREIGN PATENT DOCUMENTS

| | | |
|---|---|---|
| EP | 2129026 A1 | 12/2009 |
| GB | 2458528 A | 9/2009 |
| WO | 2007067107 A1 | 6/2007 |

* cited by examiner

*Primary Examiner* — Tanmay Shah
(74) *Attorney, Agent, or Firm* — Patent Portfolio Builders, PLLC

(57) ABSTRACT

An antenna device and method for precoding data in a MIMO system. The antenna device comprises a plurality of physical antennas in a distributed antenna system and a MIMO precoder. The MIMO precoder has a plurality of inputs for a plurality of data streams and a plurality of outputs for the plurality of data streams. A second precoder is disposed in series with the MIMO precoder. The second precoder maps a data stream to an output associated with a physical antenna port associated with at least one of the plurality of physical antennas.

8 Claims, 6 Drawing Sheets

ANTENNA DEVICE AND METHOD FOR PRECODING DATA IN A MULTIPLE-INPUT MULTIPLE-OUTPUT SYSTEM

TECHNICAL FIELD

The invention relates to the field of antenna devices, and in particular to antenna devices for use with a Multiple-Input Multiple-Output system.

BACKGROUND

One way to improve the spectral efficiency and bitrate in a wireless network is to use Multiple-Input Multiple-Output (MIMO) technology. MIMO technology has been introduced in the Third Generation Partnership Project (3GPP) Release 7, and involves sending and receiving multiple information streams using multiple antennas at both the sending and receiving end.

Current implementations of MIMO require so-called precoding. Precoding allows the mapping of information streams to different antennas via a set of complex weights that are known to the receiver. In open-loop precoding, the precoding weights are predefined. In closed-loop precoding, the receiver estimates which precoding weights will give the best throughput, and signals this choice back to the transmitter. To reduce the need for feedback signalling, many standards specify a restricted set of possible precoder weights. The restricted set of possible precoder weights is known as the codebook. By using the codebook, the receiver can simply signal back the identity of the preferred precoder obtained from the codebook. The transmitter, which also has access to the codebook, can then apply the correct precoder weights to the transmitted MIMO signal.

In the Long Term Evolution (LTE) standard, closed-loop precoding may either be wideband or frequency-selective. Wideband precoding is more robust and requires less feedback information, but frequency selective precoding can better handle the case when the channel is frequency selective and no single precoder is optimal over the whole frequency band.

Transmitted information streams are typically mapped to orthogonal precoders at the transmitter. However, these streams, when transmitted over the wireless channel, will typically be mixed. This can best be understood by considering a simple orthogonal mapping consisting of transmitting stream 1 from transmit antenna 1 and stream 2 from transmit antenna 2. A receiver with two antennas will receive the superposition of the two transmitted streams on each of its receive antennas. The receiver must then separate the mixed streams. An optimal receiver is the so called Maximum Likelihood (ML) receiver. Such a receiver uses complex non-linear operations. A more practical receiver, that is more likely to be implemented in products, is the linear Minimum Mean Square Error (MMSE) receiver. An MMSE receiver is more sensitive to correlation between mixed streams in a channel.

The gains from MIMO operation are usually the highest when the wireless channels from each transmitting antenna to each receiving antenna have similar power, and experience uncorrelated fast fading variations. If fading correlation and/or power imbalance appear between the antennas channels, the gain normally decreases in comparison, reducing the advantages of MIMO.

MIMO has primarily been utilized for the down-link in cellular networks, where the transmitter (a base station) typically utilizes multiple antennas that are deployed in close proximity, and which have essentially equal radiation patterns. However, some other scenarios are now gaining increased attention.

An important scenario of interest is when distributed antennas are utilized. An example of a use of distributed antennas is an indoor deployments where a distributed antenna system can be used to provide coverage in a cell where the path loss from a single transmit/receive antenna is too high to support adequate communication quality everywhere within the cell area. The base station serving the cell has one antenna port, and a combining/splitting network that distributes the signals from the antenna port to multiple physical antennas within the area. This ensures that the "effective" antenna is very large, and users in the area are likely to be close to at least one of the physical antennas. In this way, users all have access to the base station in a large cell, whereas if the base station had physical antennas in the same location, users might be out of range or "line of sight", and not be able to communicate with the base station.

Distributed antenna systems are most common in indoor environments such as an office building, shopping mall, or airport terminal. However, a distributed antenna system may also be deployed in an outdoor environment if the intended cell shape is difficult to achieve using a single antenna. An example is an elongated cell along a railway line. The peak bit rate and spectral efficiency improvement available using MIMO technology is very desirable in indoor areas where users require similar bit rates to wireless LANs. A straight-forward approach to a distributed antenna system is illustrated in FIG. 1. An indoor environment 1, such as an airport terminal, is provided with several co-located physical antennas 2, 3, 4, 5, 6. Each antenna group has one physical antenna (denoted by a black filled circle) connected to port 1 of the base station, and another physical antenna (denoted by an unfilled circle) connected to port 2 of the base station. This type of arrangement ensures wide coverage owing to the distributed groups of antennas, and using grouped antennas connected to different ports of the base station allows higher bitrates between the base station and a user device using MIMO. However, this approach can be costly.

It is possible for MIMO to be used on the uplink (from the user device to the base station), where the user device is able to transmit using multiple antennas. Owing to the limitations of RF and antenna design in compact user devices, it is likely that unequal power will be transmitted from the antennas at the user device, owing to differences in radiation patterns, antenna efficiencies, shielding by the user, and/or owing to the design of the power amplifiers (for example, if a secondary power amplifier with less output power is used for a secondary antenna).

SUMMARY

An issue for High Speed Packet Access (HSPA)-MIMO relates to how legacy Single-Input Single-Output (SISO) users are handled. A common precoder may be applied to both MIMO as well as non-MIMO transmissions. The common precoder is designed such that SISO transmission is mapped to both transmit antenna ports in order to utilize both power amplifiers. However, owing to the orthogonality between SISO signals and the precoded MIMO signals, not all single-stream precoders will result in full utilization of both power amplifiers, leading to inefficient use of the power amplifiers. For two of the four possible precoders, the streams are transmitted on a single antenna port. For optimal power amplifier utilization this is undesirable and of a codebook restriction has been proposed to ensure that the non-balanced precoders are not used. In the LTE standard there are no issues with legacy SISO users.

The invention introduces a fixed mapping from antenna ports at the transmitter to the physical antennas. This fixed mapping can be viewed as an additional precoder that is common for all signals. The purpose of this common precoder is to ensure that the streams are mapped to individual antennas for some choices of precoders. A preferred method is to utilize a common precoder that is the inverse of one particular precoder in the used codebook. The benefits are two-fold: First, the pilots (in the current LTE and HSPA standards) will due to the common precoder each be transmitted from all physical antennas, which removes the influence of timing and power offsets between the antennas. Second, for some choices of precoders in the codebooks, the streams will each be transmitted from a single antenna. In these cases the negative impact on MMSE receiver performance in time or in space will be minimized, leading to improved single- and multi-stream performance According to a first aspect of the invention, there is provided an antenna device for precoding data in a MIMO system. The antenna device comprises a plurality of physical antennas in a distributed antenna system and a MIMO precoder, the MIMO precoder having a plurality of inputs for a plurality of data streams and a plurality of outputs for the plurality of data streams. A second precoder is disposed in series with the MIMO precoder. The second precoder maps a data stream to an output associated with a physical antenna port associated with at least one of the plurality of physical antennas.

An an option, the second precoder performs an inverse operation to that performed by the MIMO precoder.

The second precoder is optionally arranged to map all data stream pilot signals to each physical antenna port associated with the plurality of physical antennas.

In an optional embodiment, the second precoder is disposed in series between a plurality of power amplifiers and the plurality of physical antennas. Alternatively, the second precoder is disposed in series before a plurality of power amplifiers and the plurality of physical antennas.

According to a second aspect of the invention, there is provided a method of precoding data in a MIMO system, the method comprising providing a MIMO precoder, the MIMO precoder having a plurality of inputs for a plurality of data streams and a plurality of outputs for the plurality of data streams. A second precoder disposed in series with the MIMO precoder maps a data stream to an output associated with a physical antenna port associated with at least one of a plurality of physical antennas in a distributed antenna system.

The second precoder optionally performs an inverse operation to that performed by the MIMO precoder.

As a further option, the second precoder, maps all data stream pilot signals to each physical antenna port associated with the plurality of physical antennas.

The method optionally comprises passing the data stream through the second precoder before it passes through a power amplifier, or alternatively passing the data stream through the second precoder after it passes through a power amplifier.

According to a third aspect of the invention, there is provided a radio base station comprising an antenna device as described in the first aspect of the invention.

The radio base station optionally comprises a memory in the form of a computer readable medium on which is stored computer readable code which, when run on the radio base station, causes the radio base station to perform the method as described in the second aspect of the invention.

According to a fourth aspect of the invention, there is provided a user device comprising a plurality of physical antennas, a MIMO precoder, the MIMO precoder having a plurality of inputs for a plurality of data streams and a plurality of outputs for the plurality of data streams, and a second precoder disposed in series with the MIMO precoder, the second precoder arranged to map a data stream to an output associated with an individual physical antenna of the plurality of physical antennas.

According to a fifth aspect of the invention, there is provided a computer program, comprising computer readable code which, when run on an apparatus, causes the apparatus to behave as a radio base station as described in the third aspect of the invention.

According to a sixth aspect of the invention, there is provided a computer program product comprising a computer readable medium and a computer program as described in the fifth aspect of the invention, wherein the computer program is stored on the computer readable medium.

DETAILED DESCRIPTION

Figure 1:
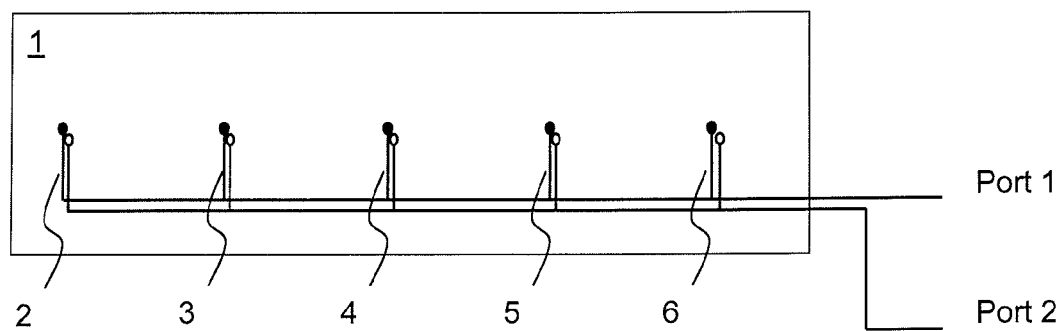
FIG. 1 illustrates schematically in a block diagram a prior art distributed antenna system.
Figure 2:
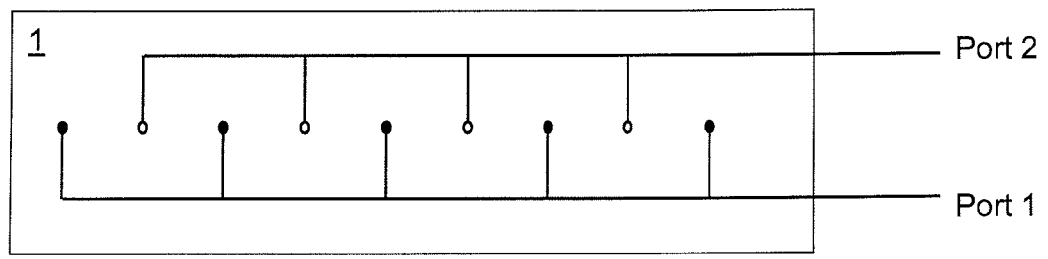
FIG. 2 illustrates schematically in a block diagram a distributed antenna system according to an embodiment of the invention.

One way to reduce the cost of using MIMO in a distributed antenna arrangement is to combine a subset of the physical antennas to each antenna port. This may be done in such a way as to increase the likelihood that signal strengths of wireless channels from each antenna port to the user device are similar, thereby resulting in good MIMO gains. One way to achieve this is by interleaving the physical antennas as shown in FIG. 2. Unlike the arrangement shown in FIG. 1, pairs of antennas connected to ports 1 and 2 of the base station are not disposed at the same location, but interleaved. Of course, the interleaving arrangement is shown by way of example. It will be appreciated that other arrangements may be used where pairs of antennas connected to ports 1 and 2 are not co-located.

A disadvantage of the arrangement shown in FIG. 2 is that, owing to fact that the antennas connected to ports 1 and 2 are not grouped as co-located antennas, the feeder lengths from the base station to the physical antennas differ, as does the propagation delay over air. The result of this is that the receiver at the user device may observe significant delay differences between the different antenna ports. Similarly, increased frequency selectivity is likely to occur owing to the multi-path propagation resulting from the multiple distributed physical antennas.

Many standards, such as HSPA and LTE, standardize codebooks to ensure that each stream is distributed over multiple antenna ports. This would have two consequences in the scenario depicted in FIG. 2:

1. A timing difference between the antennas is translated to time dispersion on each stream. The effective channels that the streams are transmitted over becomes more frequency selective, and so a wideband closed-loop precoding scheme will result in a loss of performance as no precoder weights will be optimal over the whole frequency band. LTE has provisions for a frequency selective precoding scheme but there is still a trade-off between the granularity in the frequency domain and the performance. Frequency-selective precoding also increases the signalling overhead. Furthermore, HSPA performance when using linear equalization in the time domain at the receiver will suffer due to the increased time dispersion. This can lead to diminishing returns or even create losses in the expected gains of introducing MIMO.

Furthermore, downlink (from the base station to the user device) pilot signals are transmitted on each antenna port to allow the user device to estimate the amplitude and phase of the channel from each antenna. This is required in order to demodulate the sent data symbols and also to enable the user device to select a preferred rank and codebook. However, most standards require that the delay difference between the antenna ports (e.g. between pilots) is below 65 ns. Depending on where the antenna port is defined, this requirement may be difficult to achieve with a distributed antenna system due to the large variations in feeder lengths.

2. A power difference between the antennas will result in an increased correlation between the streams. As a linear Minimum Mean Square Error (MMSE) receiver for MIMO is sensitive to inter-stream correlation the result will likely be a loss of performance compared to an optimal (ML) receiver. Hence, some of the gains from introducing MIMO will be cancelled.

Figure 3:
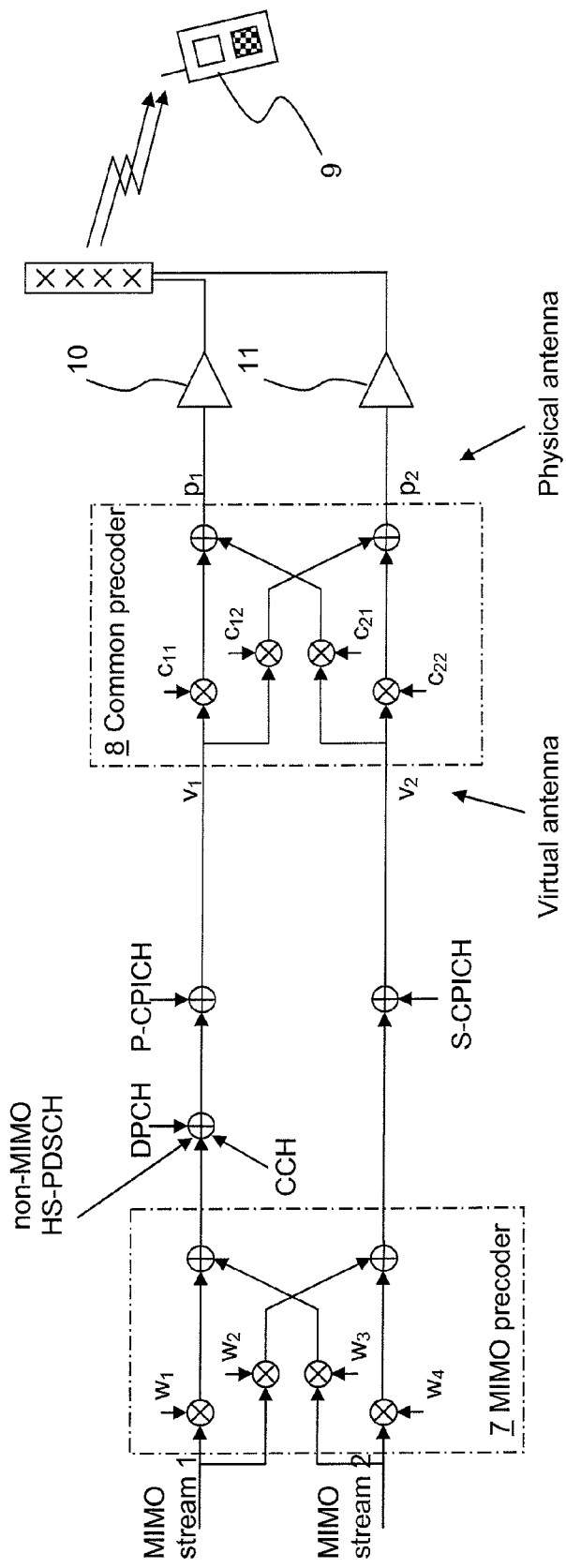
FIG. 3 illustrates schematically in a block diagram a common precoder according to an embodiment of the invention.

In order to address these problems, a common precoder is used. An example of a common precoder for operation in HSPA is shown in FIG. 3. A MIMO precoder 7 [$w_1$ $w_2$; $w_3$ and $w_4$] provides a mapping from MIMO streams 1 and 2 to virtual antenna ports $v_1$ and $v_2$ according to a standardized codebook. Pilot signals sent on the Common Pilot Channel (P-CPICH) and the Secondary Common Pilot Channel (S-CPICH) are added to the virtual antenna ports. A common precoder 8 [$c_{11}$ $c_{12}$; $c_{21}$ and $c_{22}$] provides a mapping from virtual antenna ports $v_1$, $v_2$ to physical antenna ports $p_1$, P2.

By way of illustration, the MIMO codebook for HSPA is specified in Third Generation Partnership Project Technical Standard 25.214 as follows:

$$w_3 = w_1 = 1/\sqrt{2} \quad (1)$$

$$w_4 = -w_2 \quad (2)$$

$$w_2 \in \left\{ \frac{1+j}{2}, \frac{1-j}{2}, \frac{-1+j}{2}, \frac{-1-j}{2} \right\} \quad (3)$$

A receiving user device 9 determines the preferred $w_2$ weight and signals this, together with the preferred number of streams, to the base station.

A MIMO operation in LTE is similar but uses a different codebook that also supports up to 4 transmit antennas.

In contrast to existing MIMO arrangements, respective MIMO streams may be mapped to a single physical antenna port. For example, MIMO stream 1 may be mapped to physical antenna port $p_1$ in which case MIMO stream 2 is mapped to physical antenna port $p_2$. This is achieved using the common precoder 8 in combination with a specific selection of precoder from the codebook. According to an implementation of the invention, the common precoder 8 is the inverse of one of the possible MIMO precoders. For example, for HSPA the common precoder is inv([$w_1$ $w_2$; $w_3$ $w_4$]) for a choice of $w_2$ (and $w_4$). For the four possible choices of $w_2$, the following will be the outcomes:

1. Stream 1 is mapped to $p_1$ (and stream 2 is mapped to p2)
2. Stream 1 is mapped to $p_2$ (and stream 2 is mapped to $p_1$)
3. Stream 1 is mapped with equal power to $p_1$ and $p_2$ (same for stream 2)
4. Stream 1 is mapped with equal power to $p_1$ and $p_2$ (same for stream 2)

In circumstances in which there are delay and/or power offsets between the antennas on ports $p_1$ and $p_2$, the radio channel for case 1) and 2) above will become more beneficial for MIMO communication owing to the transmission on a single antenna. This is particularly advantageous in the distributed MIMO network described above.

In an embodiment of the invention, the common precoder 8 is placed after the power amplifiers 10, 11 in order to achieve full power amplifier utilization when a single stream is transmitted. However, due to non-phase coherent radio chains it might be required to perform the common precoder operation in a base band, before the streams are passed through power amplifiers. In that case, a stream mapped to a single antenna will only utilize a single power amplifier, leading to less output power. On the other hand, a common precoder placed before the power amplifiers will achieve full power amplifier utilization for non-MIMO legacy users in HSPA.

The Signal to Noise Ratio (SNR) per stream of a MIMO MMSE receiver is given by equation 4 below:

$$\eta_k = \frac{1}{\left[ \left( \frac{\rho}{M_T} H^H H + I_{M_T} \right)^{-1} \right]_{k,k}} - 1 \quad (4)$$

where H is a channel matrix of size $M_R \times M_T$ and $\rho$ is the SNR. $M_R$ is the number of receive antenna ports and $M_T$ is the number of transmit antenna ports.

The use of a precoder W results in an effective channel $\hat{H} = HW$ and therefore results in a different per-stream SNR $\hat{\eta}_k$. The Shannon capacity C (in other words, the maximum amount of information that can be reliably transmitted) of a link with SNRs $\hat{\eta}_k$ is $$C = \sum_k \log_2(1 + \eta_k).$$

In order to provide exemplary illustrations of the invention, a power offset between the physical antennas has been evaluated using the above expressions. The channel H is assumed to comprise 2×2 ($M_R \times M_T$) uncorrelated complex Gaussian channel coefficients with a 5 dB offset between the power on the transmitting antennas. The LTE codebook has been used, and the rank and precoder giving the highest Shannon capacity C for each channel realization has been applied.

Figure 4:
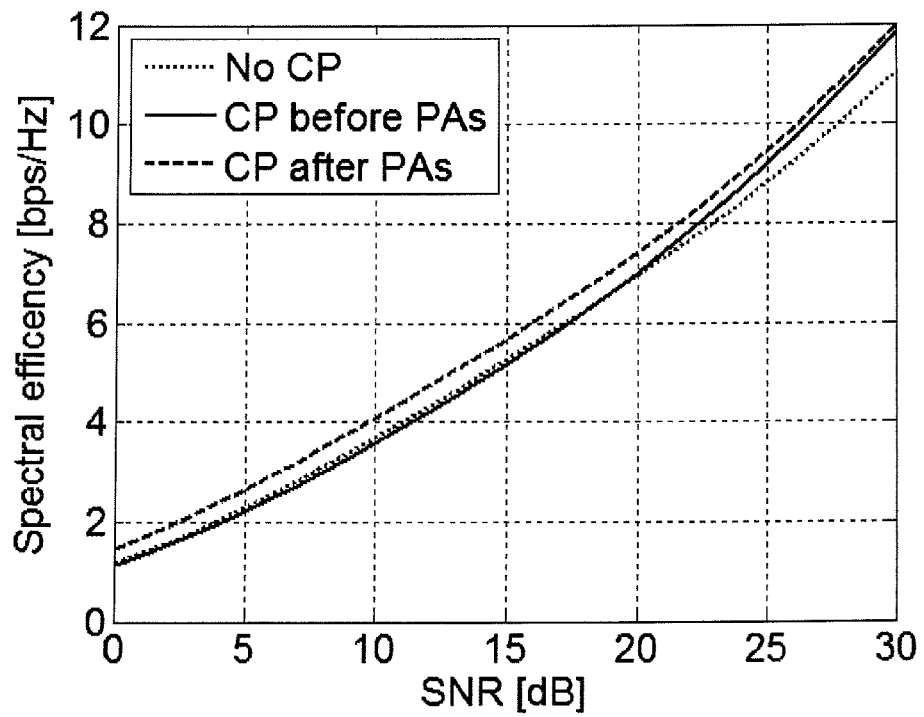
FIG. 4 is a graph showing spectral efficiency for precoding with and without a common precoder according to embodiments of the invention.
Figure 5:
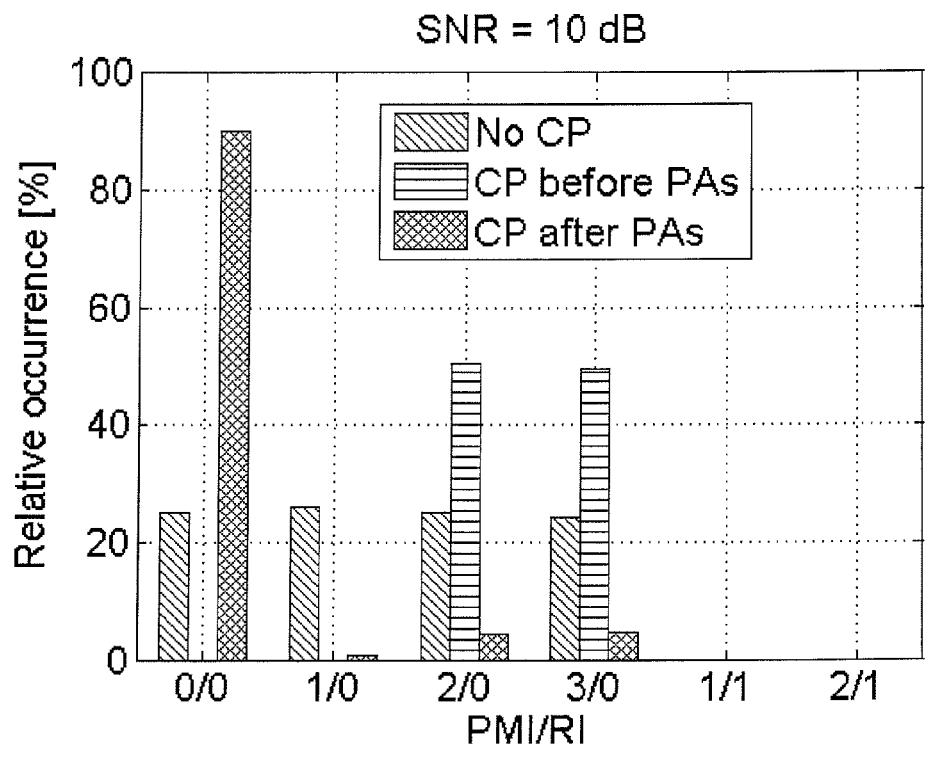
FIG. 5 is a graph showing Pre-coding Matrix Indicator and Rank Indicator statistics with a Signal to Noise ratio of 10 dB for precoding with and without a common precoder according to embodiments of the invention.
Figure 6:
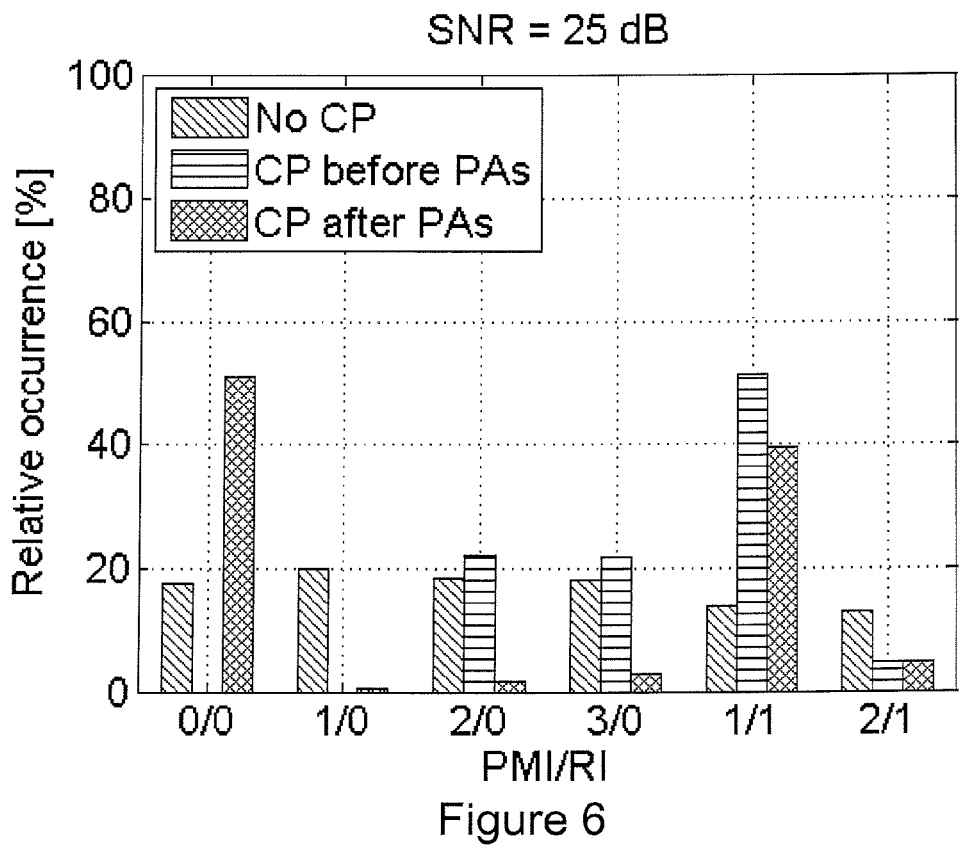
FIG. 6 is a graph showing Pre-coding Matrix Indicator and Rank Indicator statistics with a Signal to Noise ratio of 25 dB for precoding with and without a common precoder according to embodiments of the invention.

Three cases are shown in the FIGS. 4 to 6, the reference case with no common precoder (referred to as No CP in the Figures), a common precoder located after the power amplifiers, requiring calibrated radio chains (and referred to a CP after PAs in the Figures), and a common precoder located before the power amplifiers (referred to as CP before PAs in the Figures).

As shown in FIG. 4, for a 5 dB transmission power offset, a common precoder located after the power amplifiers can provide significant gains for all SNRs. As shown in FIGS. 5 and 6, the Pre-coding Matrix Indicator (PMI) and Rank Indicator (RI) statistics indicate that this is due to more efficient power utilization for one-stream transmissions (the precoder that transmits all power on the strongest antenna port is strongly preferred) and less inter-stream interference for two-stream transmissions (the precoder that maps one stream per physical antenna is strongly preferred). FIG. 5 shows the PMI and RI statistics for precoding using the LTE 2×2 codebook, an MMSE receiver and a 5 dB power offset between the transmit antennas at a SNR of 10 dB, and FIG. 6 shows the same statistics but with a SNR of 25 dB.

When the common precoder is placed before the power amplifiers, a MIMO stream that is mapped to p1 will only utilize one of the power amplifiers. This is not an issue for two-stream transmission since the other stream will simultaneously be mapped to the other power amplifier, enabling full utilization of the available power resources. However, when the user device requests a single stream to transmitted, some choices of precoder will result in only half the available power being utilized. Thus, these particular choices of precoder are less efficient at providing an adequate channel to the user device and therefore are less likely to be selected by the user device. This in turn reduces some of the benefits of closed-loop precoding, resulting in a slight loss of about 0.3-0.4 dB compared to operation without a common precoder. However, at high SNRs where two-stream transmission is predominantly requested, this disadvantage disappears and gains are seen instead.

The gain in a delay offset scenario can be illustrated with reference to the distributed antenna system illustrated in FIG. 2. In this hypothetical scenario there are nine physical antennas where every odd-numbered antenna is connected to antenna port 1 and every even-numbered antenna is connected to antenna port 2. Due to propagation delays in the fibre-optical and RF feed network there are delay offsets between the physical antennas, and the propagation delay over the air will also differ. The result is increased time dispersion.

Figure 7:
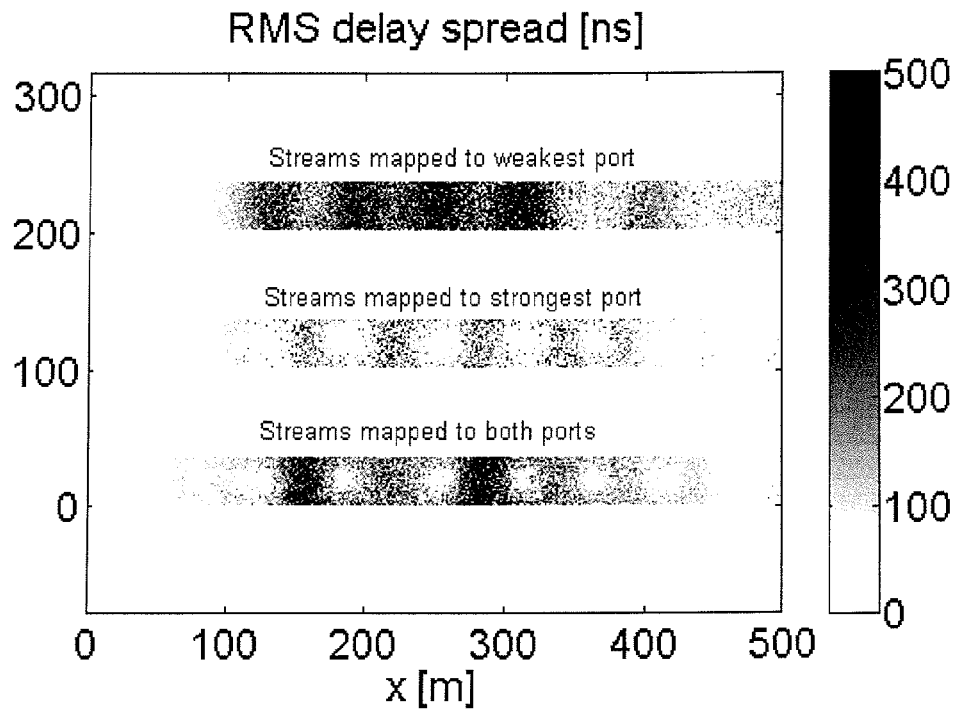
FIG. 7 is a graph showing RMS delay spread for mapping streams to both antenna ports, mapping streams to the strongest antenna port using a common precoder according to an embodiment of the invention, and mapping streams to the weakest antenna port using a common precoder according to an embodiment of the invention.
Figure 8:
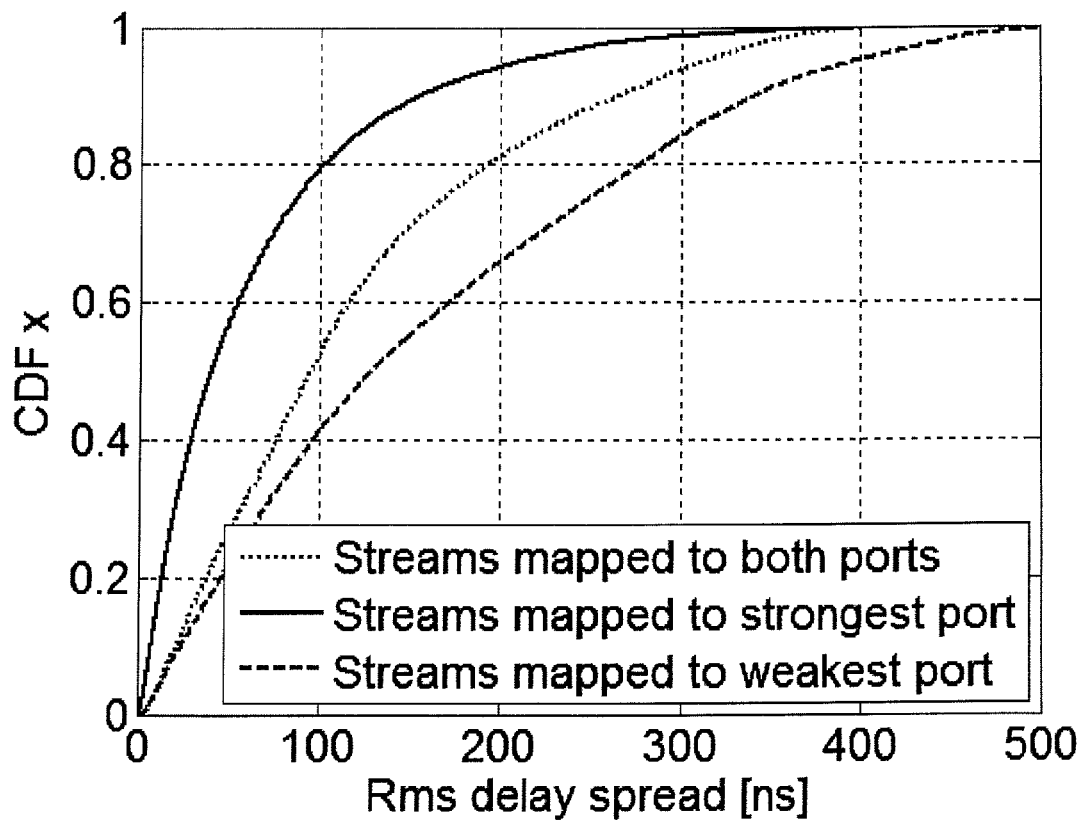
FIG. 8 is a graph showing Cumulative Distribution Functions for the RMS delay spread for mapping streams to both antenna ports, mapping streams to the strongest antenna port using a common precoder according to an embodiment of the invention, and mapping streams to the weakest antenna port using a common precoder according to an embodiment of the invention.

By using a common precoder as described above, streams mapped to a single antenna port will experience different time dispersion to streams mapped to both antenna ports. The benefit of transmitting a stream on one antenna port only can be seen in the FIGS. 7 and 8, which are graphs showing RMS delay spread and Cumulative Distribution Functions for the RMS delay spread for mapping streams to both antenna ports, mapping streams to the strongest antenna port using a common precoder as described above, and mapping streams to the weakest antenna port using a common precoder as described above.

Compared to streams transmitted over both antenna ports, a stream transmitted on the strongest antenna port experiences roughly half as much time dispersion. This should be especially beneficial for e.g. a HSPA receiver utilizing a linear equalizer. However, one disadvantage is the increased time dispersion on the second (weaker) stream. In other words, the present invention makes equalization of time dispersion easier on the stronger stream, and more difficult on the weaker stream. As the stronger stream may carry more data than the weaker stream, and the user device only requests two-stream transmission when the SNR is high enough, one can expect a positive net effect, particularly at lower SNRs.

Figure 9:
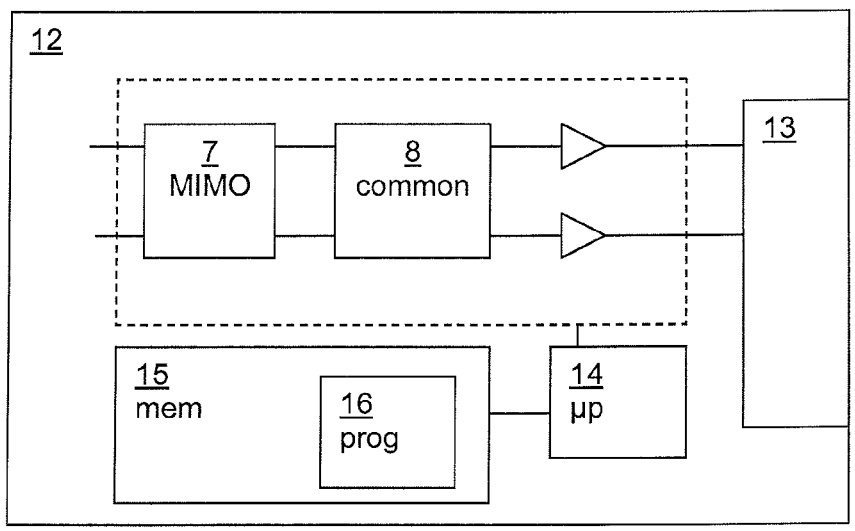
FIG. 9 illustrates schematically in a block diagram a base station according to an embodiment of the invention.

By way of example, a base station 12 is illustrated in FIG. 9. The base station 12 is connected to a plurality of physical antennas 13. A microprocessor 14 implements the operation of the MIMO precoder 7 and the common precoder 8 as described above. A memory 15 in the form of a computer readable medium is also provided. A program 16 is stored in the memory. When the program is executed by the processor 14, it causes the processor to perform the precoding operations described above.

Figure 10:
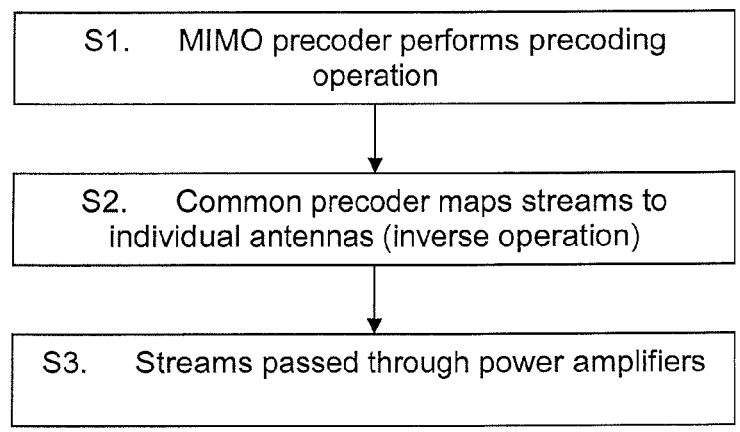
FIG. 10 is a flow diagram showing steps of embodiments of the invention.
Figure 11:
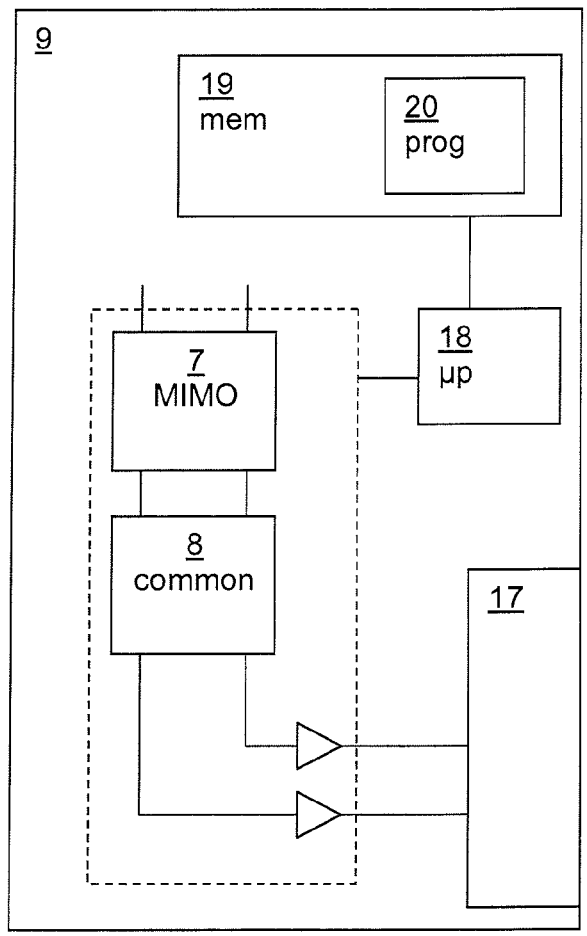
FIG. 11 illustrates schematically in a block diagram a user device according to an embodiment of the invention.

FIG. 10 is a flow diagram illustrating the steps of the invention, with the following numbering corresponding to that of FIG. 10:

S1. The MIMO precoder 7 performs a precoding operation.

S2. The common precoder 8 performs an inverse precoding operation in order to map MIMO data streams to individual antennas.

S3. The MIMO data streams are passed through power amplifiers 10, 11.

The above steps may be performed in any order, and are not limited by the order presented above. In particular, step S3 may precede step S2, such as when step S2 is performed on RF using a passive circuit such as a 90 degree hybrid combiner or similar multiport device. When step S2 is performed prior to step S3 it is preferably done at the baseband using digital signal processing.

The invention compensates and reduces the impact of multiple antenna deployment introduced impairments on MIMO multi stream signals, specifically in the areas of signal timing offset, for example by creating an induced delay spread of the received signal, and in the area of power imbalance from multiple antennas.

The described deployment introduced impairments above may specifically be expected in distributed antenna systems in indoor environments and the invention can create cost efficient implementations supporting multi-stream transmissions as previously described. However, the proposed invention is not limited to the above type of scenario or environment, but may also be used for a MIMO uplink with different implementation constraints on a small form factor type of user device. For example, FIG. 1 illustrates a user device 9 that is provided with a plurality of physical antennas 17. A microprocessor 18 controls the operation of a MIMO precoder 7 and a common precoder 8 as described above. A memory 19 in the form of a computer readable medium is also provided. A program 20 is stored in the memory. When the program 20 is executed by the processor 18, it causes the processor 18 to perform the precoding operations described above.

It will be appreciated by a person of skill in the art that various modifications may be made to the above-described embodiments without departing from the scope of the present invention.

The following abbreviations have been used in the above description:
3GPP Third Generation Partnership Project
HSPA High Speed Packet Access
LTE Long Term Evolution
MIMO Multiple-Input Multiple-Output
ML Maximum Likelihood
MMSE Minimum Mean Square Error
P-CPICH Common Pilot Channel
S-CPICH Secondary Common Pilot Channel
SISO Single-Input Single-Output
SNR Signal to Noise Ratio

The invention claimed is:

1. An antenna device for precoding data in a Multiple-Input Multiple-Output system, the antenna device comprising:
   a plurality of physical antennas in a distributed antenna system;
   a Multiple-Input Multiple-Output precoder, the Multiple-Input Multiple-Output precoder having a plurality of inputs for receiving a plurality of data streams and arranged to map weighted combinations of the data streams to a plurality of precoded outputs via a set of weights; and
   a second precoder disposed in series with the Multiple-Input Multiple-Output precoder, the second precoder arranged to receive the precoded outputs and map at least one weighted combination of the precoded outputs to an output associated with a physical antenna port associated with at least one of the plurality of physical antennas, wherein the second precoder is arranged to perform an inverse operation to that performed by the Multiple-Input Multiple-Output precoder, and wherein the second precoder is arranged to map all data stream pilot signals to each physical antenna port associated with the plurality of physical antennas.

2. The antenna device according to claim 1, wherein the second precoder is disposed in series between a plurality of power amplifiers and the plurality of physical antennas.

3. The antenna device according to claim 1, wherein the second precoder is disposed in series before a plurality of power amplifiers and the plurality of physical antennas.

4. A method of precoding data in a Multiple-Input Multiple-Output system, the method comprising:
   providing a Multiple-Input Multiple-Output precoder, the Multiple-Input Multiple-Output precoder having a plurality of inputs for receiving a plurality of data streams and mapping weighted combinations of the data streams to a plurality of precoded outputs via a set of weights; and
   at a second precoder disposed in series with the Multiple-Input Multiple-Output precoder;
      receiving the precoded outputs and mapping at least one weighted combination of the precoded outputs to an output associated with a physical antenna port associated with at least one of a plurality of physical antennas in a distributed antenna system;
      performing an inverse operation to that performed by the Multiple-Input Multiple-Output precoder; and
      mapping all data stream pilot signals to each physical antenna port associated with the plurality of physical antennas.

5. The method according to claim 4, further comprising passing the precoded outputs through the second precoder before it passes through a power amplifier.

6. The method according to claim 4, further comprising passing the precoded outputs through the second precoder after it passes through a power amplifier.

7. A radio base station comprising:
   a plurality of physical antennas;
   a Multiple-Input Multiple-Output precoder, the Multiple-Input Multiple-Output precoder having a plurality of inputs for receiving a plurality of data streams and arranged to map weighted combinations of the data streams to a plurality of precoded outputs via a set of weights; and
   a second precoder disposed in series with the Multiple-Input Multiple-Output precoder, the second precoder arranged to receive the precoded outputs and map at least one weighted combination of the precoded outputs to an output associated with a physical antenna port associated with at least one of the plurality of physical antennas, wherein the second precoder is arranged to perform an inverse operation to that performed by the Multiple-Input Multiple-Output precoder, and wherein the second precoder is arranged to map all data stream pilot signals to each physical antenna port associated with the plurality of physical antennas.

8. A user device comprising:
   a plurality of physical antennas;
   a Multiple-Input Multiple-Output precoder, the Multiple-Input Multiple-Output precoder having a plurality of inputs for receiving a plurality of data streams and arranged to map weighted combinations of the data streams to a plurality of precoded outputs via a set of weights; and
   a second precoder disposed in series with the Multiple-Input Multiple-Output precoder, the second precoder arranged to receive the precoded outputs and map at least one weighted combination of the precoded outputs to an output associated with an individual physical antenna of the plurality of physical antennas, wherein the second precoder is arranged to perform an inverse operation to that performed by the Multiple-Input Multiple-Output precoder, and wherein the second precoder is arranged to map all data stream pilot signals to each physical antenna port associated with the plurality of physical antennas.

* * * * *

UNITED STATES PATENT AND TRADEMARK OFFICE
CERTIFICATE OF CORRECTION

Page 1 of 1

PATENT NO. : 9,106,289 B2
APPLICATION NO. : 13/879991
DATED : August 11, 2015
INVENTOR(S) : Asplund et al.

It is certified that error appears in the above-identified patent and that said Letters Patent is hereby corrected as shown below:

On the title page item (75), under "Inventors", in Column 1, Line 3, delete "Sundyberg" and insert -- Sundbyberg --, therefor.

On the title page item (74), under "Attorney, Agent or Firm", in Column 2, Line 1, delete "Patent Portfolio Builders," and insert -- Murphy, Bilak & Homiller, --, therefor.

In the specification,

In Column 5, Line 65, delete "$p_1$, $P_2$." and insert -- $p_1$, $p_2$. --, therefor.

In Column 6, Line 27, delete "to p2)" and insert -- to $p_2$) --, therefor.

In Column 7, Line 36, delete "to p1" and insert -- to $p_1$ --, therefor.

In Column 9, Line 13, delete "P-CPICH Common Pilot Channel" and insert -- P-CPICH Primary Common Pilot Channel --, therefor.

Signed and Sealed this
Twenty-third Day of February, 2016

Michelle K. Lee
*Director of the United States Patent and Trademark Office*